United States Patent
Fore, III

(10) Patent No.: US 8,852,490 B2
(45) Date of Patent: Oct. 7, 2014

(54) SYSTEMS AND METHODS OF CONCRETE APPARATUS WITH INCORPORATED LIFTER

(76) Inventor: Pat Halton Fore, III, Gulfport, MS (US)

( * ) Notice: Subject to any disclaimer, the term of this patent is extended or adjusted under 35 U.S.C. 154(b) by 1219 days.

(21) Appl. No.: 12/421,337

(22) Filed: Apr. 9, 2009

(65) Prior Publication Data

US 2010/0258980 A1    Oct. 14, 2010

(51) Int. Cl.
*B28B 3/00* (2006.01)
*B28B 21/56* (2006.01)

(52) U.S. Cl.
CPC ........................ *B28B 21/56* (2013.01)
USPC ........... 264/333; 264/144; 264/636; 264/642; 264/212; 264/299; 264/302; 264/36.2; 264/228; 264/297.9; 264/426; 264/46.7

(58) Field of Classification Search
USPC ........ 264/333, 144, 636, 212, 299, 302, 36.2, 264/228, 297.9, 426, 915; 29/897.34; 138/174, 175; 285/230
See application file for complete search history.

(56) References Cited

U.S. PATENT DOCUMENTS

| | | | | |
|---|---|---|---|---|
| 3,883,170 A | * | 5/1975 | Fricker et al. | 294/82.35 |
| 4,070,832 A | * | 1/1978 | Grosch | 52/125.4 |
| 4,635,512 A | * | 1/1987 | Wengenroth et al. | 83/156 |
| 4,807,746 A | * | 2/1989 | Jacobs | 206/321 |
| 5,832,688 A | * | 11/1998 | Crissey et al. | 52/651.01 |
| 2007/0186492 A1 | * | 8/2007 | Bennett et al. | 52/125.4 |

* cited by examiner

*Primary Examiner* — Jeffrey Wollschlager
*Assistant Examiner* — Stella Yi
(74) *Attorney, Agent, or Firm* — Benjamin A. Balser; Balser & Grell IP Law

(57) ABSTRACT

Systems and methods for a concrete apparatus with incorporated lifter are provided. A concrete apparatus is formed by placing a reinforcement system in a mold. The reinforcement system comprises a lifter. Concrete is poured into the mold such that the lifter protrudes from the poured concrete. After the concrete has hardened and the mold is removed, the lifter is used to carry and position the concrete apparatus. After the concrete apparatus is positioned, the lifter is removed at the circumference of the concrete apparatus leaving no holes, thereby eliminating water leakage due to lifting methods.

8 Claims, 3 Drawing Sheets

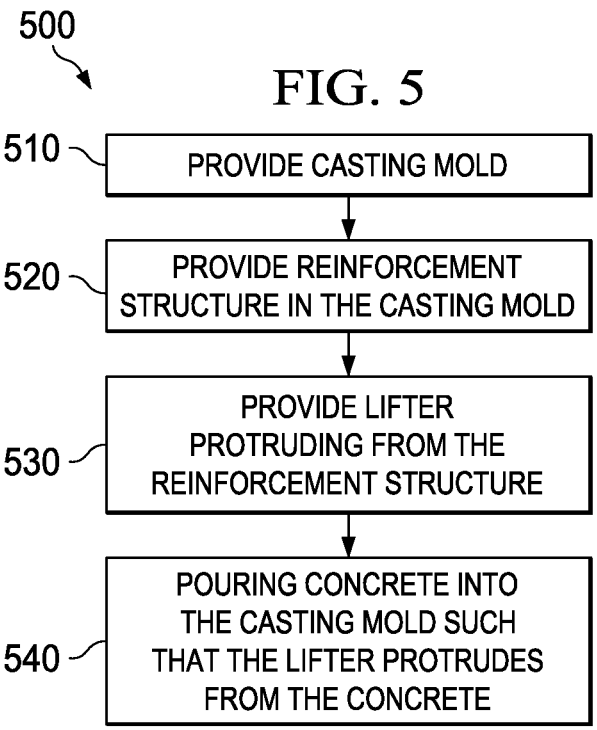
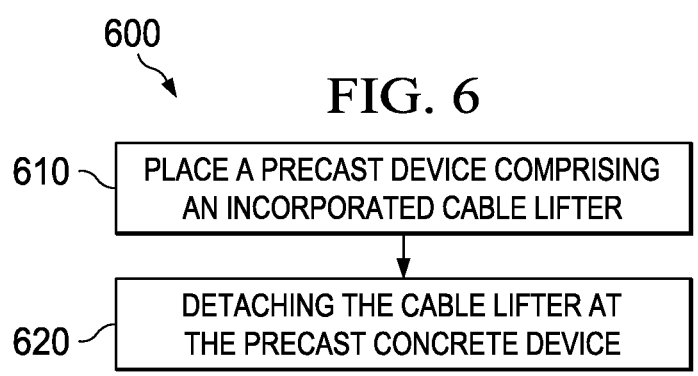

SYSTEMS AND METHODS OF CONCRETE APPARATUS WITH INCORPORATED LIFTER

TECHNICAL FIELD

The present disclosure is generally related to concrete fabrication and, more particularly, is related to precast concrete apparatus.

BACKGROUND

Precast concrete is a form of construction, where concrete is cast in a reusable mold or "form" which is then cured in a controlled environment, transported to the construction site and lifted into place. In contrast, standard concrete is poured into site specific forms and cured on site. Precast stone is distinguished from precast concrete by using a fine aggregate in the mixture so the final product approaches the appearance of naturally occurring rock or stone.

By producing precast concrete in a controlled environment (typically referred to as a precast plant), the precast concrete is afforded the opportunity to properly cure and to be closely monitored by plant employees. Many states across the United States require a precast plant to be certified (either by NPCA or PCI) for a precast producer to supply their product to a construction site sponsored by State and Federal Departments of Transportation (DOTs).

Ancient Roman builders made use of concrete and soon poured the material into molds to build their complex network of aqueducts, culverts and tunnels. Modern uses for precast technology include a variety of architectural and structural applications featuring parts of or an entire building system. Precast architectural panels are also used to clad all or part of a building facade, free-standing walls used for landscaping, soundproofing and security walls. Storm water drainage, water and sewage pipes and tunnels make use of precast concrete units. The advantages of using precast concrete is the increased quality of the material, when formed in controlled conditions, and the reduced cost of constructing large forms used with concrete poured on site.

There are many different types of precast concrete forming systems for architectural applications, differing in size, function and cost.

SUMMARY

Example embodiments of the present disclosure provide . . . . Briefly described, in architecture, one example embodiment of the apparatus, among others, can be implemented as follows: a reinforcement cage; at least one lifter; and concrete molded around the steel cage, wherein the lifter is incorporated in the molded concrete.

Embodiments of the present disclosure can also be viewed as providing methods for manufacturing a concrete device with incorporated lifter. In this regard, one embodiment of such a method, among others, can be broadly summarized by the following: providing a casting mold; providing a reinforcement structure in the casting mold; providing a lifter protruding from the reinforcement structure; and pouring concrete into the casting mold such that the lifter protrudes from the concrete.

Embodiments of the present disclosure can also be viewed as providing methods for using a concrete device with incorporated lifter. In this regard, one embodiment of such a method, among others, can be broadly summarized by the following: placing a precast concrete device comprising an incorporated cable lifter; and detaching the cable lifter at a perimeter of the precast concrete device.

BRIEF DESCRIPTION OF THE DRAWINGS

FIG. 5 is a flow diagram of an example embodiment of a method of manufacturing the concrete device of FIG. 3.

FIG. 6 is a flow diagram of an example embodiment of a method of using the concrete device of FIG. 3.

DETAILED DESCRIPTION

Figure 1:
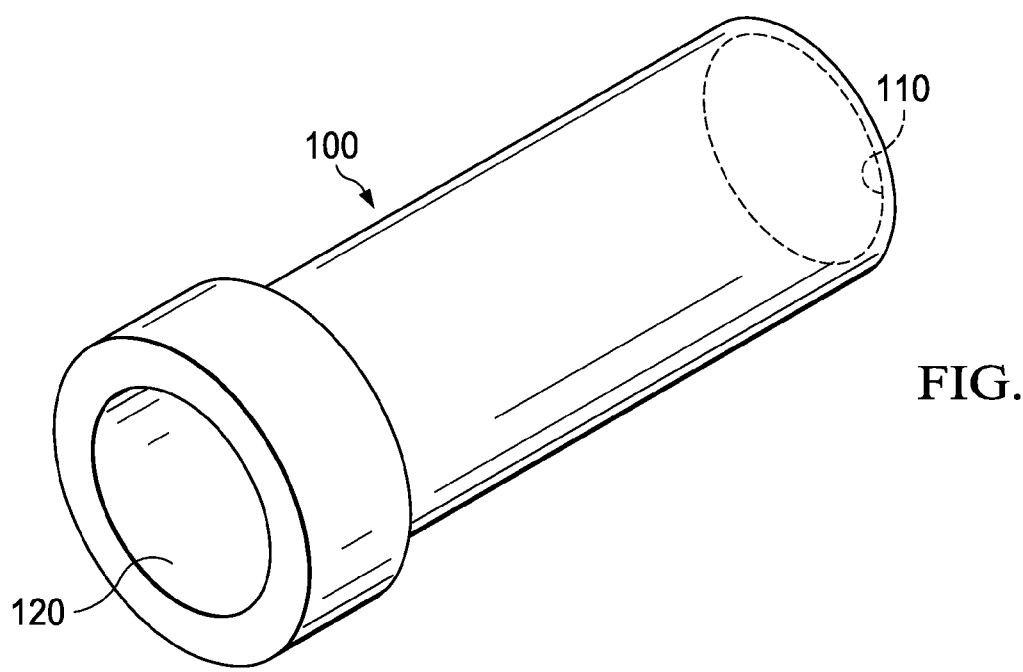
FIG. 1 is a diagram of an example embodiment of a concrete device.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Concrete is the world's most commonly used building material. In its simplest form, concrete may be a mixture of paste and aggregates. The material (paste) used to manufacture concrete pipe may be composed principally of cement and water, and may be used to coat the surface of the fine and coarse aggregates. The cement may be a closely controlled chemical combination of calcium, silicon, aluminum, iron, and small amounts of other compounds, to which gypsum may be added in the final grinding process to regulate the setting time of the concrete. The cement's chemistry comes to life in the presence of water. Soon after the cement and water are combined, hydration occurs and the paste hardens and gains strength to form a rock-like mass, the concrete. During hydration, a node forms on the surface of each cement particle. The node grows and expands until it links up with nodes from other cement particles or adheres to adjacent aggregates. Within this process lies the key to concrete—it's plastic and malleable when newly mixed and strong and durable when hardened.

The character of the concrete may be determined by the quality of the paste. The strength of the paste, in turn, may depend on the ratio of water to cement. The water-cement ratio is the weight of the mixing water divided by the weight of the cement. High-quality concrete may be produced by lowering the water-cement ratio as much as possible without sacrificing the workability of fresh concrete. Generally, using less water produces a higher quality concrete provided the concrete is properly placed, consolidated, and cured. Typically, a mix may be about 10 to 15 percent cement, 60 to 75 percent aggregate and 15 to 20 percent water. Entrained air in many concrete mixes may also take up another 5 to 8 percent.

Almost any natural water that is drinkable and has no pronounced taste or odor may be used as mixing water for concrete. However, some waters that are not fit for drinking may be suitable for concrete. Specifications usually set limits on chlorides, sulfates, alkalis, and solids in mixing water unless tests can be performed to determine what effect the impurity has on various properties.

The type and size of the aggregate mixture depends on the thickness and purpose of the final concrete product. A continuous gradation of particle sizes is desirable for efficient use of the paste. In addition, aggregates are preferably clean and free from any matter that might affect the quality of the concrete.

Curing may begin after the exposed surfaces of the concrete have hardened sufficiently to resist marring. Curing ensures the continued hydration of the cement and the strength gain of the concrete. Concrete surfaces may be cured by steam or water. The longer the concrete is kept moist, the stronger and more durable it will become. The rate of hardening may depend upon the composition and fineness of the cement, the mix proportions, and the moisture and temperature conditions. Most of the hydration and strength gain may take place within the first month of concrete's life cycle, but hydration continues at a slower rate for many years. Concrete continues to get stronger as it gets older.

Precast concrete products may be cast in a factory setting. Precast concrete products may benefit from tight quality control achieved at a production plant. Precast concrete pipe may be produced in highly controlled plant environments under rigid production standards and testing specifications. Previous methods of moving precast concrete pipe have involved leaving a hole in the precast concrete pipe, inserting a lifting means in the hole and using the lifting means to move the precast concrete pipe into position. After the precast concrete pipe was moved into position, the lifting means was removed and the hole is plugged. The hole may be a source for leaking and weakness in the precast concrete pipe. However, using the apparatus and methods of precast concrete device with incorporated lifter disclosed herein, the hole in the concrete pipe is eliminated such that the concrete pipe isn't weakened, and is actually strengthened compared to the previous lifting methods.

FIG. 1 provides an example embodiment of precast concrete pipe 100. It should be noted that an example of a concrete pipe is used in this disclosure, the methods and systems disclosed herein may be applicable in any type of precast concrete device. Concrete pipe 100 is shown with a first end 120 and a second end 110. Although this pipe is shown as a hollow pipe, the pipe could be solid, or the device could alternatively be a precast culvert, pullbox, catch basin, retaining wall, manhole sections, and building panel, as non-limiting examples. Concrete pipe 100 is shown to be straight and circular, but may be elliptical, arched, bent, and curved, as non-limiting examples.

Figure 2:
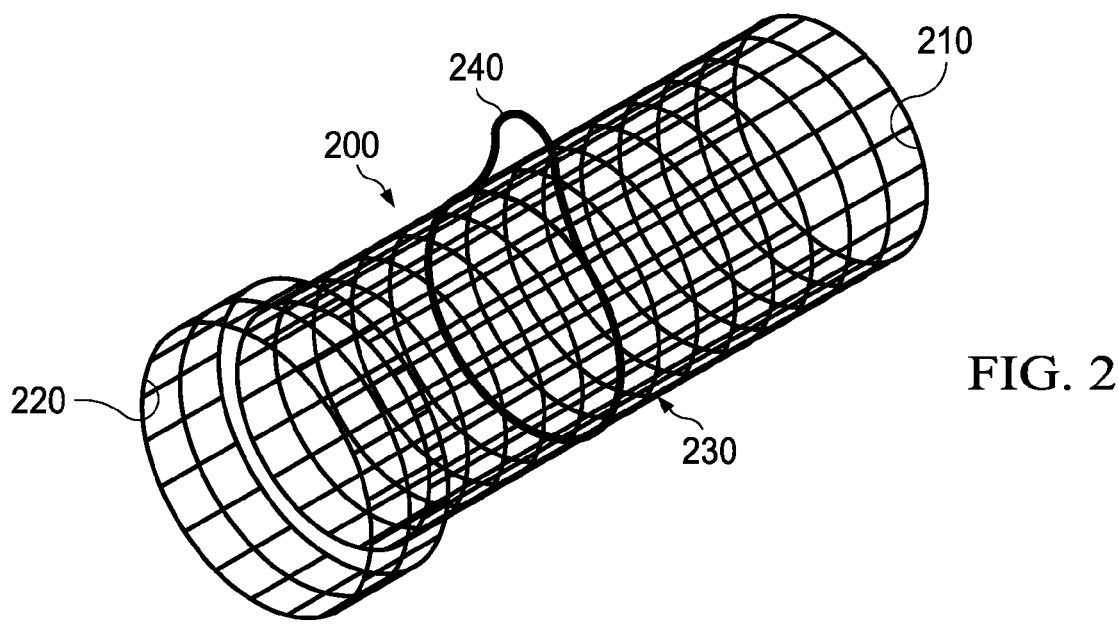
FIG. 2 is a diagram of an example embodiment of a reinforcement structure with incorporated lifter used in the concrete device of FIG. 1.

FIG. 2 provides an example embodiment of reinforcement system 200. This example embodiment of reinforcement system 200 comprises reinforcement cage 230 with a first open end 220 and a second open end 210. Reinforcement cage 230 may be constructed of steel, fiber, and fiber-reinforced plastic as non-limiting examples. Lifter 240 is incorporated to provide lifting functionality after concrete is poured around reinforcement cage 230. Lifter 240 is placed such that lifter 240 protrudes past the outer diameter of concrete pipe 100. Lifter 240 may be separate from reinforcement cage 230 or it may be an integrated part of reinforcement cage 230. Lifter 240 may be incorporated into reinforcement cage 230 by interweaving in an over and under method. Lifter 240 extends out from reinforcement cage 230, and may be a lengthened piece of reinforcement cage 230 or a slackened piece of reinforcement cage 230 as non-limiting examples. Lifter 240 may be comprised of galvanized steel or any other material which is strong enough to support the weight of concrete pipe 100.

Regarding the use of the galvanized lifter cable, the galvanized cable will not rust and it is easy to use. Additionally, no further attachments are necessary.

Figure 3:
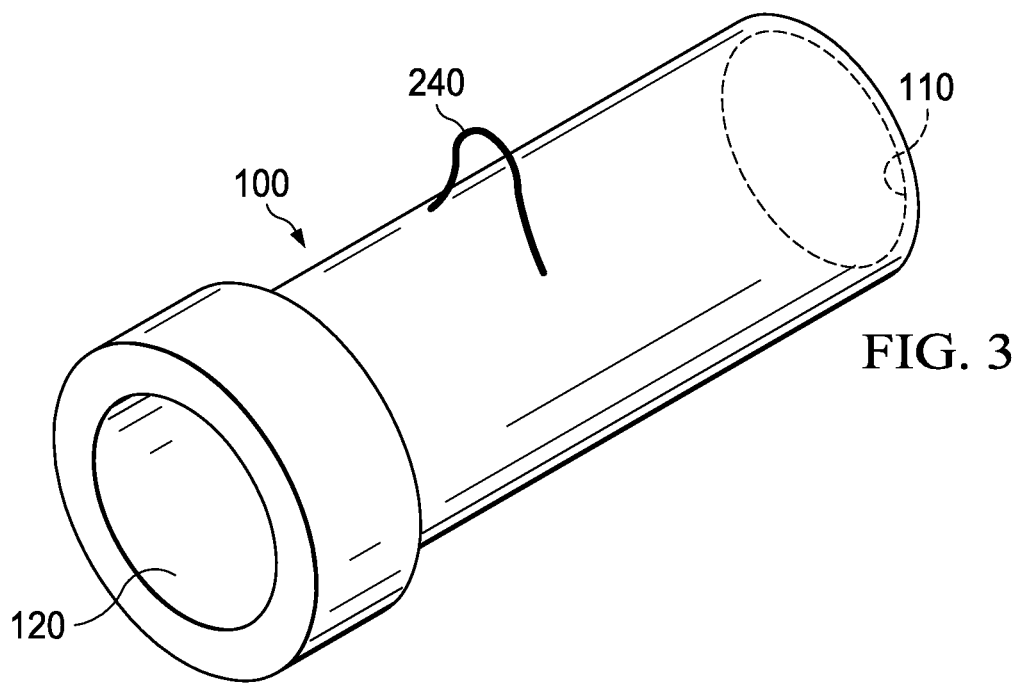
FIG. 3 is a diagram of an example embodiment of the concrete device of FIG. 1 with the lifter of FIG. 2.

Reinforcement system 200 is placed in a concrete mold (not shown) and concrete is poured into the mold encasing reinforcement system 200. Once the concrete is poured into the mold, lifter 240 may be folded down until the mold is removed and lifter 240 springs up for lifting. FIG. 3 provides concrete pipe 100 after the mold has been removed with lifter 240 protruding from concrete pipe 100. Lifter 240 makes for a safe and easy way to lift, transport, and lay concrete pipe 100.

Figure 4:
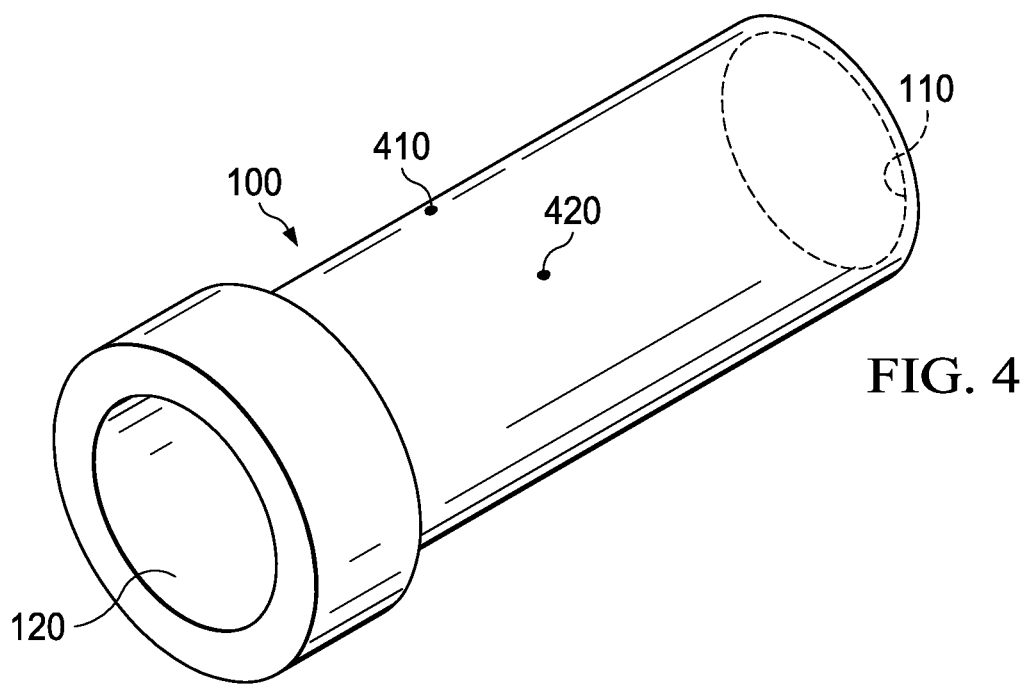
FIG. 4 is a diagram of an example embodiment of the concrete device of FIG. 3 with the lifter removed at the outer circumference of the concrete device.

After pipe 100 is laid in a desired position, lifter 240 may be left in position. In an alternative embodiment, however, lifter 240 may be removed. FIG. 4 provides concrete pipe 100 with the protruding section of lifter 240 detached at points 410, 420 on the outer surface of concrete pipe 100. If lifter 240 is a galvanized cable, lifter 240 may be severed with a cable cutter or other detachment means. By severing lifter 240 at the outer surface of concrete pipe 100, lifting holes and water leakage may be reduced or substantially eliminated.

FIG. 5 provides a flow chart of an example embodiment of method 500 of manufacturing a concrete device with an incorporated lifter. In block 510 of method 500, a casting mold is provided. In block 520, a reinforcement structure is provided in the casting mold. In block 530, a lifter is provided, the lifter protruding from the reinforcement structure. In block 540, concrete is poured into the casting mold such that the lifter protrudes from the concrete.

FIG. 6 provides method 600 of using a concrete device with incorporated lifter. In block 620 a precast concrete device is placed, the precast concrete device comprising an incorporated cable lifter. In block 620, the cable lifter is detached at the perimeter of the precast concrete device.

Therefore, at least the following is claimed:

1. A method of manufacture comprising:
   providing a reinforcement structure;
   providing a lifter protruding from the reinforcement structure, the lifter an integrated lengthened loop of the reinforcement structure; and
   applying concrete onto the reinforcement structure such that the lifter protrudes from a flush surface of the concrete.

2. The method of claim 1, wherein the reinforcement structure is a welded wire cage.

3. The method of claim 1, wherein the lifter comprises a galvanized cable.

4. The method of claim 1, further comprising folding the lifter down after the applying of the concrete; and
   allowing the lifter to spring up for lifting.

5. A method comprising:
   placing a concrete device comprising an incorporated cable lifter, the incorporated cable lifter comprising an integrated lengthened loop of a reinforcement structure in the concrete device, protruding from a flush surface of the concrete device; and
   detaching the cable lifter at a perimeter of the concrete device.

6. The method of claim 5, wherein the concrete device is a concrete pipe.

7. The method of claim 5, wherein the cable lifter comprises galvanized steel.

8. The method of claim 5, wherein detaching the cable lifter comprises cutting the cable lifter at a perimeter of the concrete device.

* * * * *